Jan. 5, 1954 P. K. RICE ET AL 2,664,719
PROCESS AND APPARATUS FOR SEPARATING GAS MIXTURES
Filed July 5, 1950 3 Sheets-Sheet 1

INVENTORS
PHILIP K. RICE
EDWARD F. YENDALL
BY D.C. Harrison
ATTORNEY

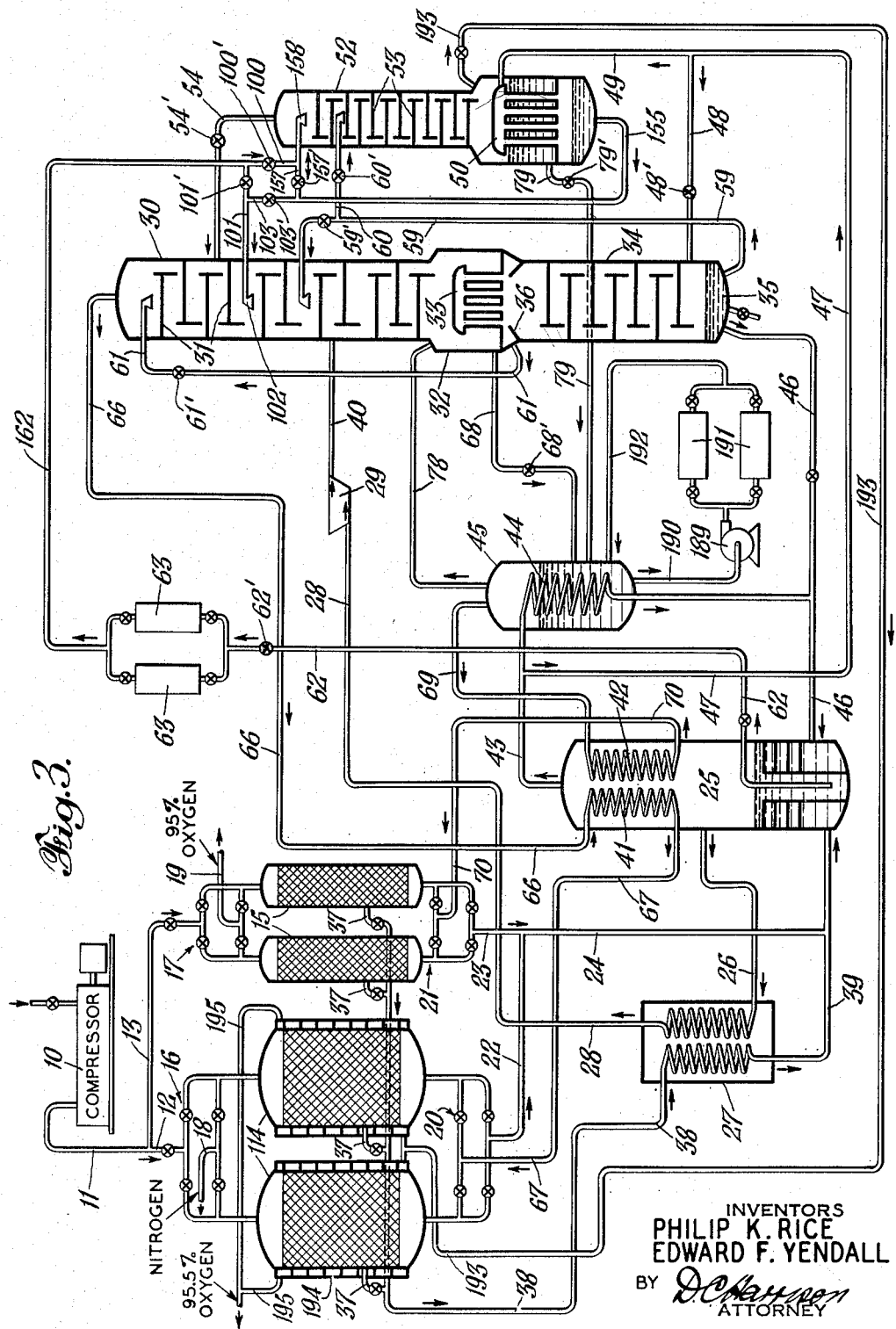

Patented Jan. 5, 1954

2,664,719

UNITED STATES PATENT OFFICE 2,664,719

PROCESS AND APPARATUS FOR SEPARATING GAS MIXTURES

Philip K. Rice and Edward F. Yendall, Kenmore, N. Y., assignors, by mesne assignments, to Union Carbide and Carbon Corporation, a corporation of New York Application July 5, 1950, Serial No. 172,138

20 Claims. (Cl. 62—122)

This invention relates to a process and apparatus for separating gas mixtures and more particularly to an improved process and apparatus for the low-temperature separation of air to produce a nitrogen product and oxygen products of different purity.

Large volume, low-cost oxygen of 95 to 98% purity has recently become commercially important and a process and apparatus for the efficient production of such oxygen is described in our co-pending patent application Serial No. 94,332, now Patent No. 2,619,810, filed May 20, 1949. This system or cycle provides low operating costs with good operating flexibility and a reasonable investment cost. For some industrial uses a smaller volume supply of higher-purity oxygen is often required in addition to the lower-purity oxygen, and it is a principal object of the present invention to provide an improved process and apparatus for separating air to make such higher-purity oxygen in addition to the low-cost lower-purity oxygen.

Several possible changes in an existing plant could be made in order to produce high-purity as well as low-purity oxygen. For example, the rectifying column of a plant such as that described in our aforementioned patent application could be modified to operate so that high-purity oxygen is made in the boiling chamber at the base of the main low-pressure rectifying chamber, the stream of high-purity oxygen being withdrawn from such boiling chamber while the desired lower-purity oxygen product is withdrawn from the main column at a point several rectifying trays above such boiling chamber. While simple, such method is costly, because it would increase the power cost as a result of the need for a higher condensation pressure in the main condenser which heats the boiling chamber. The higher condensation pressure is required because the boiling temperature of, for example, 99.5% oxygen at the operating pressure of the main rectifying column is nearly 1° C. higher than the boiling temperature of, for example, 95% purity oxygen at the same pressure. The pressure required to effect condensation of the nitrogen is about 5 p. s. i. higher for effecting boiling of the higher-purity oxygen than for boiling 95% oxygen, and the compression of air to the higher pressure requires at least a 3.7% increase in power.

The addition of a second low-pressure rectifying column has been proposed to be operated so as to produce the high-purity oxygen in its boiling chamber, but this also requires the supply of air to its condenser at the higher pressure needed to condense nitrogen for making a reflux liquid. Further difficulties arise due to the accumulation of hydrocarbon impurities in the boiling chambers of the rectifying columns. Steps and means are employed to avoid such difficulties in the process and apparatus disclosed in our aforesaid patent application in connection with a single main column, but the use of similar steps and means in connection with a second column would result in excessive complications and also a lack of operating flexibility.

Further objects of the present invention are to provide an improved process and apparatus for producing high-purity oxygen in a second column and lower-purity oxygen in a main column; in which there is required substantially no increase of the air supply pressure over that needed for production of the lower-purity oxygen alone; which provides great flexibility in the proportion of the high-purity oxygen produced; which avoids the difficulty of hydrocarbon accumulation in the second column by simple and effective means; which, in preferred embodiments, provides positive pressure flow of fluids to and from the second column; and which may be readily added to and integrated with an existing air separating plant.

Another object of the invention is to provide a simple and effective means for utilizing the refrigeration of a stream of high-purity oxygen product of a plant also producing lower-purity oxygen and having cold accumulators for cooling and preliminarily cleaning the air.

These and other objects and advantages of the invention will become apparent from the following description and the accompanying drawings, in which:

Fig. 3 is a similar view of another embodiment according to the invention which employs crude oxygen feed to the second column and heating of the high-purity oxygen make by a heat exchange passage associated with the main air cooling cold accumulators.

Figure 1:
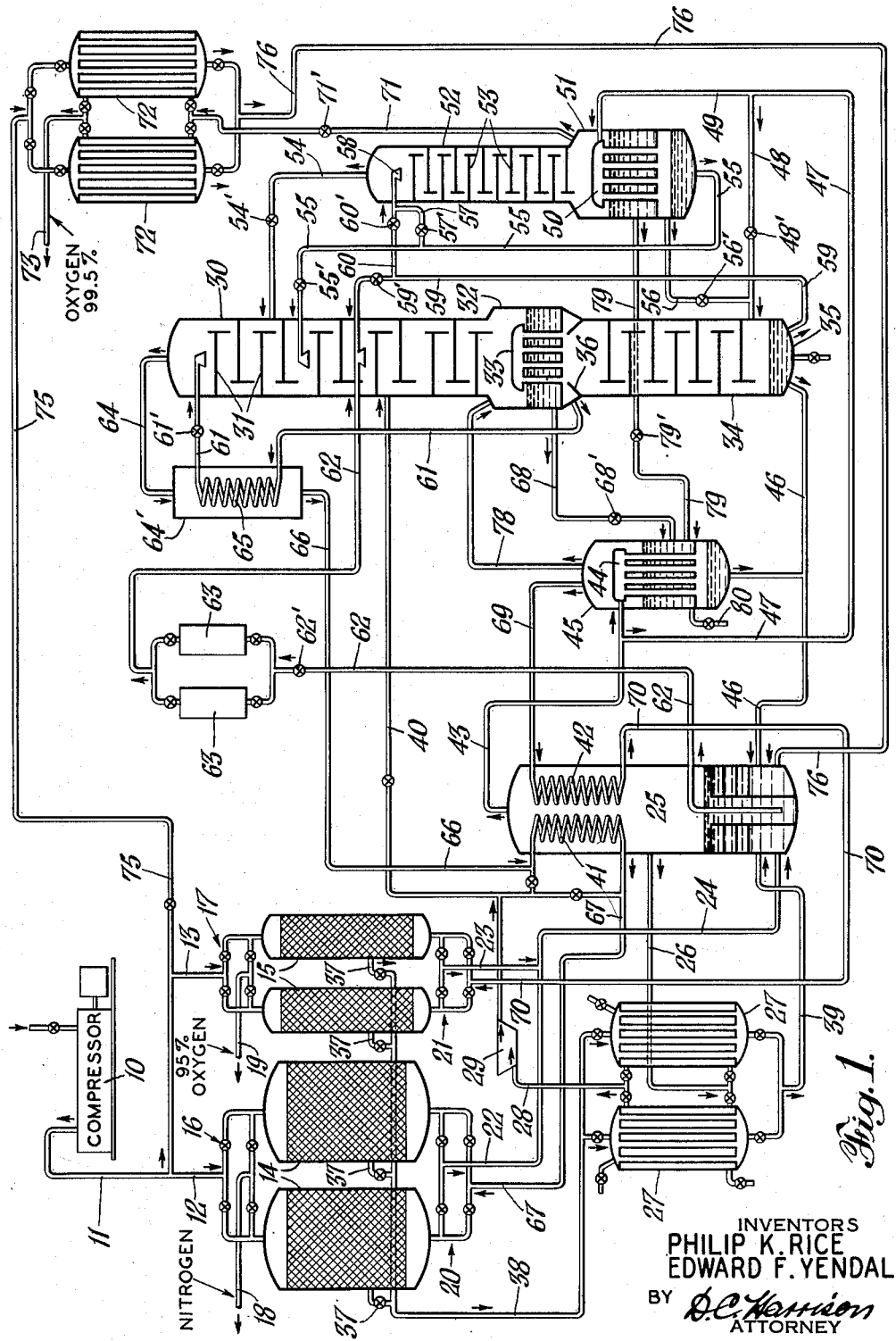
Fig. 1 is a diagrammatic view of an exemplary assemblage of apparatus illustrating an embodiment of the invention in which the liquid feed into the second column is crude oxygen.

Referring now to the drawings, and particularly to Fig. 1, it is to be understood that various means may be employed to prepare a supply of air to condition it for feeding to a rectifying column. The air must be cleaned of those impurities which freeze out and which may cause difficulties. For producing low-cost oxygen, the cold accumulator type of heat exchanger has proved efficient and effective to cool air by heat exchange with outflowing separation products and to remove the moisture and most of the carbon dioxide. The residue of carbon dioxide and the hydrocarbon impurities of air must also be eliminated before the air is rectified. A preferred method and apparatus for preparing the air for rectification which is illustrated in the accompanying drawings is similar to that described in our aforesaid patent application.

As shown in Fig. 1, air may be compressed to a condensation pressure below 125 p. s. i., for example about 70 p. s. i., by a centrifugal type compressor 10, and the air under such pressure is conducted by conduit 11 and branch conduits 12 and 13 to the air inlet or warm ends of two pairs of cold accumulators 14 and 15 which have reversing valve assemblies 16 and 17 at their warm ends. The reversing valve assemblies also connect to a nitrogen discharge outlet 18 and an oxygen discharge outlet 19 respectively, the cold accumulators 14 being adapted for effecting heat transfer between incoming air and outgoing nitrogen product, while the cold accumulators 15 are adapted to effect heat exchange with another portion of incoming air and the outgoing low-purity (95%) oxygen product. Check valve assemblies 20 and 21 are connected respectively to the nitrogen cold accumulators and the oxygen cold accumulators to discharge cooled incoming air through respective conduits 22 and 23 to a conduit 24 which discharges all of the regenerator-cooled air into the lower end of a scrubber chamber 25. A portion of scrubbed air is conducted from the scrubber 25 through a conduit 26 to a heating passage of one of a pair of reheat exchangers 27 and the reheated air is then conducted by conduit 28 to an air expansion turbine 29 where such portion of air is expanded with the production of external work to the pressure of the main low-pressure rectifying column indicated at 30. The column 30 is generally of the customary type comprising a tower-like chamber containing gas and liquid contact-effecting trays 31 and having an oxygen boiling chamber 32 at its lower end. The liquid collected in the boiling chamber 32 is preferably heated by a condenser 33 which may be of the backward-return type or a simple condenser connected to receive vapors from the top of a high-pressure chamber 34 disposed below the column 30. The bottom or sump 35 of the high-pressure chamber 34 collects a crude oxygen liquid and a shelf 36 in the upper part of the chamber 34 may be arranged to collect a large portion of the liquid rich in nitrogen made by condensation of the nitrogen vapors in the condenser 33.

The reheating of the air to be expanded in the turbine 29 may be effected in various ways, but it is preferably accomplished by bleeding off a portion of air from the cold accumulators 14 and 15 through bleed-off connections 37 connected to a conduit 38 which conducts the bleed-off air to cooling passages in the reheat exchangers 27 from which the thus-cooled portion of air is conducted by a conduit 39 to the lower part of the scrubber chamber 25. The expanded air from the turbine is conducted by a conduit 40 to an intermediate portion of the column 30.

The air, which has been cooled to a temperature close to the condensation temperature and still under the condensation pressure, is subjected to a series of successive liquefactions to provide oxygen-rich liquid fractions. The first such liquefaction occurs in the upper part of the scrubber chamber 25 by heat exchange with coils 41 and 42 which are cooled by outgoing products. The clean scrubbed air leaves the scrubber chamber 25 through a conduit 43 that conducts a portion thereof to a heat exchange coil or condenser 44 located in an oxygen product evaporating chamber 45, and the resulting liquid fraction is conducted from the lower part of the condenser 44 by a conduit 46 for conducting it to the lower part of the scrubber chamber 25 to augment the scrubber liquid therein. The remainder of the clean air is conducted by conduit 47 to branches 48 and 49, the branch 48 connecting to the lower part of the high-pressure chamber 34 to provide it with the air which is condensed therein for forming the crude oxygen or oxygen-rich fraction in the sump 35 and the nitrogen fraction that is collected on the shelf 36.

The other branch 49 conducts the last remaining portion of oxygen-containing vapor portion of air at the condensation pressure to a heating coil or condenser 50 which is located in an oxygen boiling chamber portion 51 at the lower end of a second column 52. This second column has the usual gas and liquid contact trays 53 and is provided with a connection 54 at its upper end for conducting the effluent vapors from the column to an intermediate point of the main column 30. All the air that passes through the condenser 50, whether or not it is fully condensed, may be conducted therefrom through a conduit 55 to an intermediate point of the main column 30. However, if it is desired to pass only liquid through the conduit 55, a vapor connection 56 controlled by a valve 56' may be provided between the condenser 50 and the high-pressure chamber 34. A control valve 48' may also be interposed in the branch conduit 48.

The reflux for the second column 52 may be provided in several ways. For example, the conduit 55 may be provided with a branch connection 57 provided with an expansion valve 57' which connects to a liquid distributor 58 in the upper part of the column 52. The conduit 55 above the branch 57 is also provided with an expansion valve 55' and the valves 55' and 57' may be adjusted to regulate the proportion of liquid flow to either column. A preferred reflux liquid for the second column may be a portion of the crude oxygen produced in the lower part of the high-pressure chamber 34, and to this end a crude oxygen transfer conduit 59, which connects between the sump 35 and an intermediate point of the upper column and which has an expansion valve 59', may have a branch conduit 60 connected between a point on the upstream side of valve 59' and the liquid distributor 58, it being provided with an expansion valve 60'. By adjustment of the expansion valves 59' and 60', the proportion of crude oxygen liquid diverted to the second column may be adjusted. The liquid nitrogen collected by the shelf 36, which is used as reflux for the main column 30, is conducted to the top of such column by a conduit 61 provided with an expansion valve 61'.

Another reflux liquid for the main column 30 is provided by withdrawing impure scrubber liquid from the scrubber chamber 25 through a conduit 62 which has interposed therein an expansion valve 62' and a pair of filters 63 adapted for the elimination of hydrocarbon impurities.

The effluent nitrogen product of the main column 30 flows therefrom through conduit 64 to a heat exchange chamber 64' provided to subcool the nitrogen reflux in a coil portion 65 of the conduit 64. The effluent nitrogen then flows by conduit 66 to the heat exchange coil 41 and from heat exchange coil 41 through a conduit 67 to the check valve assembly 20 of the nitrogen cold accumulators 14.

The relatively lower-purity oxygen product of the main column, which collects in liquid form in the chamber 32, is conducted therefrom through a conduit 68 into the oxygen evaporator 45, from which cold gaseous oxygen is conducted by a conduit 69 to the heat exchange coil 42 in the upper part of the scrubber 25. A conduit 70 conducts the low-purity product oxygen to the check valve assembly 21 of the oxygen cold accumulators 15.

The high-purity oxygen product made in the second column is conducted preferably in the vapor state by conduit 71 to a heating means adapted for the recovery of the refrigeration contained therein. As illustrated in the embodiment of Fig. 1, such heating means may comprise a duplicate set of countercurrent heat exchangers 72 which are heated by a portion of incoming air. The conduit 71, which may have a control valve 71' therein, conducts the high-purity oxygen to one or the other of heating passages in the heat exchangers 72, and a conduit 73 connected to the warm end of one or the other of such heating passages conducts the high-purity oxygen to a place of use. A branch conduit 75 from conduit 11 conducts a portion of air to be cooled to the warm ends of air cooling passages of the heat exchangers 72, and a conduit 76 conducts cooled air from one or the other of the air cooling passages to the lower part of the scrubber 25. The heat exchangers 72 are provided in duplicate so that one which has been used for a period of time and has collected deposits of moisture and carbon dioxide may be thawed out while the other of the pair is in operation.

The connection 78 between the upper part of the evaporator 45 and chamber 32 is provided to equalize pressures. The liquid oxygen that evaporates in the chamber 51 may contain certain residual impurities that would become enriched by evaporation of the oxygen and this enrichment would tend to throw such impurities out of solution. In order that such impurities may be prevented from accumulating to dangerous proportions, they may be safely and simply eliminated by draining, preferably continuously, a small portion of the liquid oxygen from the chamber 51 to the lower-purity oxygen evaporating chamber 45, a conduit 79 having a valve 79' being provided for this purpose. Similarly, the residual hydrocarbon impurities would tend to accumulate in the evaporator 45 and to control such accumulation a drain connection 80 in the lower part of the chamber 45 is provided. Drainage of liquid oxygen at this point may be effected to prevent dangerous accumulation of impurities. The liquid drained may be discarded but it is preferable to treat it to remove the impurities so as to recover the liquid oxygen.

The operation of the assemblage of apparatus shown in Fig. 1 is believed clear from the above description. It will be seen that the refrigeration requirement is supplied by expansion of a portion of the air with the production of external work by the turbine type expander 29. Such work may be recovered for aiding the compression of air. The moisture and carbon dioxide is removed by the cold accumulators in the known manner but the residual impurities not so removed are put into a condition for removal by passage of all the air through the scrubber 25 where the air is thoroughly washed by liquid air. Such impurities which are accumulated in the scrubber liquid are removed when the excess of scrubber liquid is withdrawn through the filters 63 so that only very clean liquid is passed to the upper column 30. A very minute amount of the impurities may still remain in the air which is passed to the rectifying columns and such impurities eventually become concentrated in the boiling liquid oxygen products. The evaporation of the lower-purity oxygen make liquid by transfer of same to an evaporator 45 which is separate from the boiling chamber 32 of the main rectifying column 30 provides the desired protection for the main column 30 and effects concentration of the impurities at a place where they can be readily removed. The liquid oxygen which collects and boils in the chamber 32 boils at a pressure which is only a few pounds per square inch above atmospheric, the pressure in the main column 30 being merely that necessary to drive the product nitrogen through the successive heat exchangers and the cold accumulators 14.

The pressure of the air is determined by the temperature of boiling of the oxygen product at the main column pressure, since only a small temperature difference is necessary to provide adequate heat transfer through the walls of the condenser 33. The vapors arising to the condenser 33 in the chamber 34 are substantially pure nitrogen, and the pressure of such nitrogen must be such that it will condense at the temperature provided by the condenser. This condensing pressure of the nitrogen is the pressure at which the air must be supplied to the chamber 34, thus the pressure to which the air is compressed by the compressor 10 need only be slightly higher than such nitrogen condensation pressure in order to move the air through the regenerators and other passages. The high-purity oxygen liquid in the chamber 51 may be subject to substantially the same pressure as the main column 30. By composition difference the boiling point is about 1° C. higher so that a higher condensation pressure would be required if it were necessary to condense nitrogen in the condenser 50. However, according to the invention, adequate heating is effected by supplying air at the same pressure as in the high-pressure chamber 34 and condensing a fraction of this air which contains a substantial proportion of oxygen. It is thus seen that the apparatus provides a supply of high-purity oxygen as well as lower-purity oxygen without requiring the compression of the air to a higher pressure than that which is required for producing all lower-purity oxygen.

Impurities are prevented from accumulating in the boiling chamber 51 by effecting drainage of a small amount of the high-purity liquid oxygen from the chamber 51 to the lower-purity oxygen evaporator 45. The relative positions of chambers 51 and 45 are such that gravity assists the small pressure difference available for flow. This drainage is controlled by the valve 79'. It will be seen that except for such drainage the flow of materials to and from the second column 52 is impelled completely by positive pressure difference. Thus when reflux liquid is added to the column from the sump 35 there is a pressure drop from the high-pressure chamber 34 to the low pressure equivalent to the low pressure of the main column 30 and the liquid air supplied to the column must be expanded through the expansion valve 60'. It should be noted that if desired the crude oxygen can be subcooled before it is expanded by heat exchange with the effluent nitrogen of the column 30 in a manner similar to the subcooling by the coil 65 of the nitrogen transferred. It is also contemplated that the second column may be operated at a very slightly higher pressure than the main column 30 by providing a suitable control valve 54' in the conduit 54. Such slightly higher operating pressure in the second column 52 will insure positive drainage at a desired rate through the connection 79 in the event that gravity flow is insufficient. With slightly higher operating pressure in the second column 52, the composition of the liquid formed by the condenser 50 will be slightly richer in oxygen.

An alternative method of operation contemplates that the branch connection 48 may be entirely closed off by the valve 48' and all the air to be supplied to the high-pressure chamber 34 may be passed through the branch conduit 49, condenser 50, and conduit 56, the valve 56' being wide open. In such case the conduit 55 need not be employed, valves 55' and 57' being completely shut off and the entire quantity of reflux for the upper column being diverted from the transfer line 59 through the expansion valve 60'. With such an operation the height of liquid in the boiling chamber 51 adjusts the amount of heat exchange that takes place between the incoming air stream and the high-purity liquid oxygen.

Figure 2:
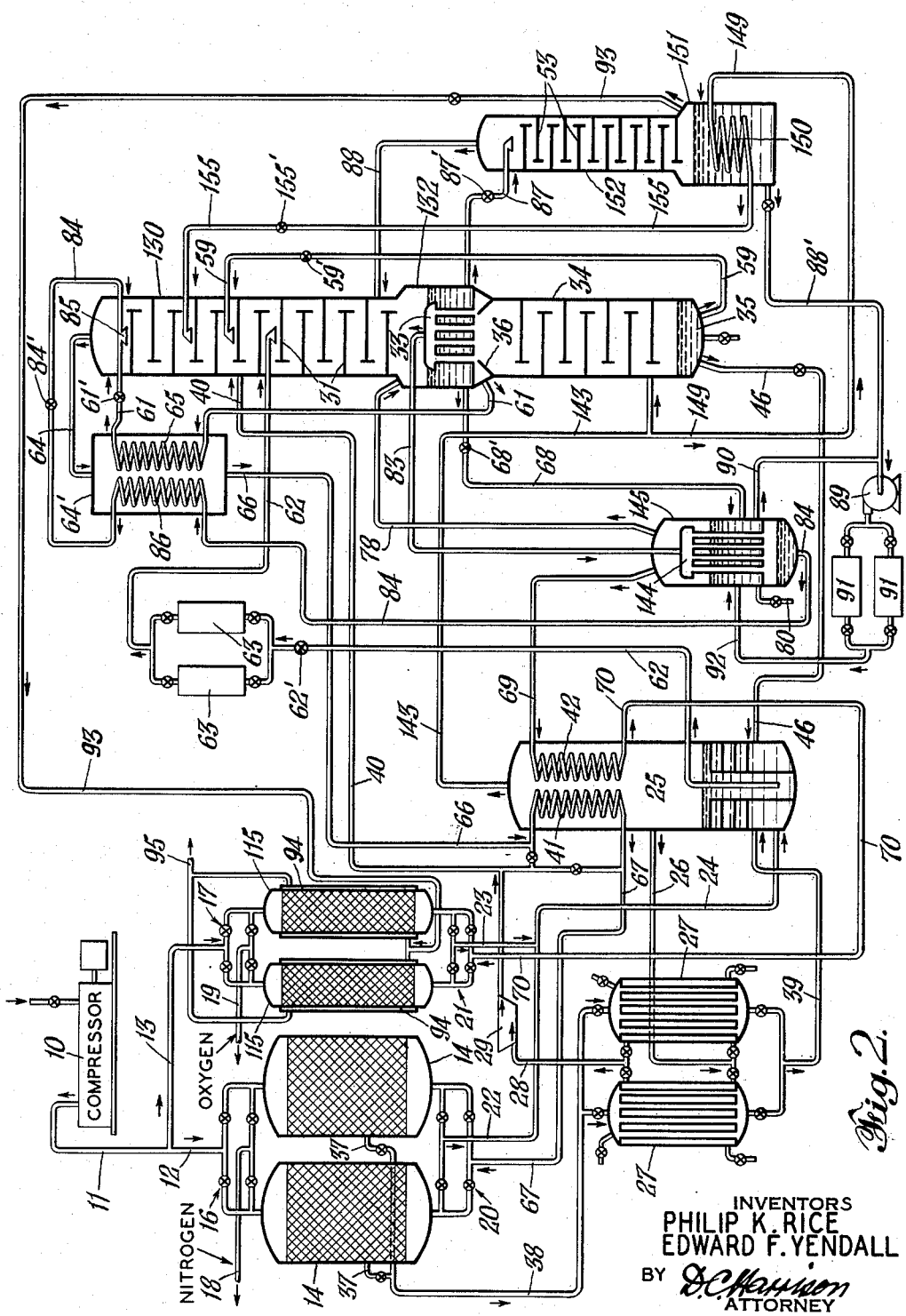
Fig. 2 is a similar view illustrating another embodiment of the invention in which the liquid feed to the second column is low-purity oxygen.

Referring now to the embodiment illustrated in Fig. 2, the features which are similar to those shown in Fig. 1 are designated by similar reference numerals. The apparatus differs in certain particulars in that the reflux nitrogen liquid for the main column 130 is produced not only from the shelf 36 under the condenser 33 but is also produced by a condenser 144 within the oxygen evaporator 145. Such nitrogen flows from the condenser 33 through a conduit 83 to the condenser 144 and the liquid nitrogen so produced flows from the bottom of the condenser 144 through a conduit 84 to the distributor 85 in the upper end of the column 130, there being a subcooling coil 86 and an expansion valve 84' interposed therein.

The second column 152 is positioned to receive a gravity flow of lower-purity oxygen from the chamber 132 through a conduit 87, the upper end of the column 152 being connected by a conduit 88 to a point just above the chamber 132 to pass effluent vapor from the second column to the main column. The cleaned air from the scrubber flows through the conduit 143 directly to the high-pressure chamber 34 and a branch 149 of the conduit 143 conducts a portion of the air to a heating coil 150 in the chamber 151 at the lower part of the column 152. From the coil 150 the condensed air is conducted by a conduit 155 to the main column 130, the conduit 155 having an expansion valve 155' therein. The crude oxygen of the sump 35 is conducted by the transfer conduit 59 to an intermediate part of the main column 130. Residual impurity removal is effected positively by providing a drain connection 88' from the lower part of the boiling chamber 151 to the inlet of a liquid oxygen pump 89. A drain conduit 90 is also provided between the lower part of the evaporator 145 and the inlet of the pump 89 and the liquids drawn from both sources are pumped through a pair of filters 91 which may, if desired, contain adsorbent material to retain dissolved as well as solidified hydrocarbon impurities. The cleaned liquid is returned from the filters 91 to the evaporating chamber 145 through a conduit 92.

The high-purity product oxygen is drawn by a conduit 93 to an oxygen passage 94 which is in heat exchange relation to the longitudinal shell of the cold accumulators 115. Such heat exchange passage may be provided by a cylindrical shell surrounding the shell of the cold accumulators 115 at small spacing. The outgoing high-purity oxygen is connected to both jackets 94 at the colder end and the high-purity product oxygen is withdrawn from the warm end of the jackets by a connection 95. If desired, spiral baffles may be provided in the interspace between the shell of the cold accumulators and the heat exchange jacket to lengthen the time of contact of the oxygen with the shells. The oxygen preferably flows through both shells simultaneously. By this expedient refrigeration of the high-purity oxygen is usefully transferred to incoming air by conduction through the cold accumulator shell walls. It is also contemplated that similar jackets can be placed around the nitrogen cold accumulators 14 and the outgoing high-purity oxygen passed simultaneously through all four heat exchange jackets.

It will be seen that the embodiment of Fig. 2 depends upon gravity drainage of liquid from the main column 130 to provide the reflux liquid for the second column 152. It is practical to employ an adequate drop in level for such drainage by employing the pump 89 to effect the positive drainage of liquid from the chamber 151 to the evaporator 145. It will also be seen that the liquid reflux for the column 152 could be drained from an intermediate point of the main column 130 instead of from the chamber 132.

The embodiment of Fig. 3 is similar to that of Fig. 1 in many features which are indicated by similar reference numbers. In the embodiment of Fig. 3 the high-purity oxygen product is conducted by a conduit 193 to the cold ends of heat exchange jackets 194 disposed about the longitudinal shell walls of the nitrogen regenerators 114 and the warmed high-purity oxygen gas is conducted from the jackets out through connections 195 at the upper or warmer ends of the jackets 194.

In Fig. 3 the impurity clean-up of the evaporating liquid in the evaporator 45 is effected by withdrawal of portions of the liquid from the bottom of the evaporator 45 by conduit 190, a pump 189 connected to force the drainage liquid through a set of filters 191, and to return the filtered liquid oxygen to the evaporator 45 through a conduit 192. The liquid feed for the second column 52 is provided from several alternative sources, thus the conduit 162 from the filters 63 connects to branches 100 and 101 having expansion valves 100' and 101' therein. The branch 101 connects to the distributor 102 at an intermediate point of the column 30 and the branch 100 connects to the distributor 158 at the upper end of the column 52. By adjustment of the valves 101' and 100' a portion of the filtered scrubber liquid may be employed as reflux in the second column 52. The liquid air produced at the condenser 50 is connected by the conduit 155 to branches 157 and 103, the former being controlled by valve 157' and connecting to the distributor 158 and the latter being controlled by expansion valve 103' and connecting to the distributor 102. As in Fig. 1, the transfer conduit 59 also has a branch 60 controlled by an expansion valve 60' and connecting to a point near the upper part of the column 52. It will be seen that in Fig. 3 great flexibility is provided in the choice of reflux liquid that may be expanded and fed to the upper end of the second column 52. Such reflux liquid may come from the filtered scrubber liquid, from the crude oxygen sump 35, or from the liquid produced in the condenser 50. Any of these liquids alone may be used or any proportion of two or all of them.

It will be seen also that great flexibility of operation is provided. The plant may be operated for the production of the lower-purity oxygen stream at a substantially steady production rate. Efficient operation of such part of the apparatus requires that the production rate remain very close to the rate for which the apparatus is designed. However, in the production of the high-purity oxygen stream great flexibility is provided in that the second column could be completely cut off from operation while the low-purity production continues. For this purpose it is merely necessary to close the valves 60', 100' and 157' feeding the reflux into the second column and the high-purity oxygen production valve. When high-purity oxygen is required, the supply of high-purity oxygen can be at a rate such that the second column operates at the highest rate for which it is designed or it can also be efficiently operated at rates substantially below such maximum rate, for example, down to one-third the rate. This is simply effected by adjustment of the feed of liquid reflux into the column and by adjusting the heating of the lower end of the column by regulating the amount of air fed to the condenser 50 or the heating coil 150.

Although preferred embodiments of the invention have been described in detail, it is contemplated that modifications of the process and the apparatus may be made and that some features may be employed without others, all within the spirit of the invention and the scope thereof as set forth in the claims. For example, the higher-purity oxygen product may be withdrawn in the liquid state if the refrigeration produced is correspondingly increased. The principles of the invention may also be applied to the separation of low boiling-point gas mixtures similar to air.

What is claimed is:

1. In a process for the low-temperature separation of air provided at a condensation pressure below 125 p. s. i., cooled to a temperature of condensation of at least one of the constituents and freed of a major portion of the moisture, carbon dioxide, and hydrocarbon impurities of atmospheric air, the steps including subjecting such air to a plurality of condensations at said pressure for providing oxygen-rich liquids, one of said condensations being effected under preliminary rectifying conditions producing also a nitrogen-rich fraction; subjecting at least a major portion of such oxygen-rich liquid fractions to a main rectification at low pressure to produce an oxygen enriched liquid containing less than 99% oxygen; producing said nitrogen rich fraction solely by heat exchange with oxygen-enriched liquid containing less than 99% oxygen, said nitrogen fraction thereby being condensed at a pressure substantially equal to the condensing pressure of nitrogen corresponding to the temperature of boiling of the oxygen-enriched liquid at said low pressure employing said nitrogen-rich fraction as reflux in said main rectification to produce a nitrogen product of very low oxygen content; separately withdrawing nitrogen product and a main oxygen product from said oxygen-rich liquid of less than 99% oxygen and effecting heat exchanges to utilize the refrigeration of said products to cool incoming air; subjecting an oxygen-containing liquid remainder of at least one of said oxygen-rich liquids to a separate rectification at low pressure to produce a high-purity oxygen product of over 99% oxygen and an effluent gas of lower oxygen content; passing such effluent gas to join with the vapors in said main low-pressure rectification; and withdrawing said high purity oxygen product while effecting indirect heat exchange between incoming air and such product.

2. A process for the low-temperature separation of air according to claim 1, in which at least part of said oxygen rich liquids are produced by heat exchange with boiling liquid oxygen product of less than 99% oxygen from said main low pressure rectification and a portion of the liquid so produced is the oxygen-containing liquid remainder that is subjected to said separate rectification for use as reflux therein.

3. A process for the low-temperature separation of air according to claim 1, in which part of said oxygen rich liquid fractions is produced by heat exchange with boiling high purity liquid oxygen product of said separate rectification and the part so produced is the oxygen-containing liquid remainder that is employed as reflux in said separate rectification.

4. A process for the low-temperature separation of air according to claim 1, in which the vapors for said separate rectification are produced by effecting heat exchange between the oxygen product of the separate rectification and an oxygen-containing vapor portion of the air at condensation pressure.

5. A process for the low-temperature separation of air according to claim 1, in which the oxygen-rich liquid which is rectified in said separate rectification is the remainder of the oxygen-rich liquid produced in said main low-pressure rectification and the vapors for said separate rectification are produced by effecting heat exchange between the oxygen product of the separate rectification and an oxygen containing vapor portion of the air at condensation pressure.

6. A process for the low-temperature separation of air according to claim 1, in which part of said oxygen rich liquid fractions is produced by heat exchange with boiling liquid oxygen product of said separate rectification and at least a substantial portion of that so produced is employed as feed to the main low pressure rectification.

7. In a process for the low-temperature separation of air provided at a condensation pressure, cooled to a temperature of condensation of at least one of the constituents and freed of a major portion of the moisture, carbon dioxide, and hydrocarbon impurities of atmospheric air, the steps including subjecting such air to a plurality of condensations at said pressure for providing oxygen-rich liquids, one of said condensations being effected under preliminary rectifying conditions producing also a nitrogen-rich fraction; subjecting at least a major portion of such oxygen rich liquid fractions to a main rectification at low pressure to produce an oxygen enriched liquid containing less than 99% oxygen; producing said nitrogen rich fraction solely by heat exchange with oxygen-enriched liquid containing less than 99% oxygen, said nitrogen fraction thus being condensed at a pressure substantially equivalent to the condensing pressure of nitrogen corresponding to the temperature of boiling of the oxygen-enriched liquid at said low pressures; employing said nitrogen-rich fraction as reflux in said main rectification to produce a nitrogen product of very low oxygen content; separately withdrawing the nitrogen product and effecting heat exchanges to utilize the refrigeration thereof for cooling incoming air; withdrawing an oxygen product from the oxygen-enriched liquid of the main rectification in the liquid state and evaporating it in a vaporizing zone by heat exchange with a portion of the air for effecting one of said successive condensations; subjecting an oxygen-containing liquid remainder of at least one of said oxygen-rich liquids to a separate rectification at low pressure to produce a high-purity oxygen product of over 99% oxygen and an effluent gas of lower oxygen content; passing such effluent gas to join with the vapors in said main low-pressure rectification; withdrawing a small portion of said high-purity oxygen product in the liquid state and joining it with the oxygen product from the main rectification in said vaporizing zone for preventing accumulation of hydrocarbon impurities and the like in both rectifications; and eliminating such impurities tending to accumulate in said vaporizing zone.

8. In a process for the low-temperature separation of air provided at a condensation pressure, cooled to a temperature of condensation of at least one of the constituents and freed of a major portion of the moisture, carbon dioxide, and hydrocarbon impurities of atmospheric air, the steps including subjecting such air to a plurality of condensations at said pressure for providing oxygen-rich liquids, one of said condensations being effected under preliminary rectifying conditions producing also a nitrogen-rich fraction; subjecting at least a major portion of such oxygen-rich liquid fractions to a main rectification at low pressure to produce an oxygen enriched liquid containing less than 99% oxygen; producing said nitrogen rich fraction solely by heat exchange with oxygen-enriched liquid containing less than 99% oxygen, said nitrogen fraction thus being condensed at a pressure substantially equivalent to the condensing pressure of nitrogen corresponding to the temperature of boiling of the oxygen-enriched liquid at said low pressure; employing said nitrogen-rich fraction as reflux in said main rectification to produce a nitrogen product of very low oxygen content; separately withdrawing the nitrogen product and effecting heat exchanges to utilize the refrigeration thereof for cooling incoming air; withdrawing an oxygen product from the oxygen-enriched liquid of the main rectification in the liquid state and evaporating it in a vaporizing zone by heat exchange with a gaseous remainder of one of said successive condensations for producing a liquid which is used as reflux in said main rectification; subjecting an oxygen-containing liquid remainder of at least one of said oxygen-rich liquids to a separate rectification at low pressure to produce a high-purity oxygen product of over 99% oxygen and an effluent gas of lower oxygen content; passing such effluent gas to join with the vapors in said main low-pressure rectification; withdrawing a small portion of said high-purity oxygen product in the liquid state and joining it with the oxygen product from the main rectification in said vaporizing zone for preventing accumulation of hydrocarbon impurities and the like in both rectifications; and eliminating such impurities tending to accumulate in said vaporizing zone.

9. In a process for the low-temperature separation of air provided at a condensation pressure, cooled to a temperature of condensation of at least one of the constituents and freed of a major portion of the moisture, carbon dioxide, and hydrocarbon impurities of atmospheric air, the steps including subjecting such air to a plurality of condensations at said pressure for providing oxygen-rich liquids, one of said condensations being effected under preliminary rectifying conditions producing also a nitrogen-rich fraction; subjecting at least a major portion of such oxygen rich liquid fractions to a main rectification at low pressure to produce an oxygen enriched liquid containing less than 99% oxygen, said nitrogen-rich fraction being produced by heat exchange with such oxygen enriched liquid in the boiling liquid state, the condensation pressure being substantially equal to the pressure required to effect condensation of the nitrogen-rich fraction by said heat exchange; employing said nitrogen-rich fraction as reflux in said rectification to produce a nitrogen product of very low oxygen content; separately withdrawing said nitrogen product and a main oxygen product from said oxygen rich liquid of less than 99% oxygen and effecting heat exchanges to utilize the refrigeration of said products to cool incoming air; subjecting an oxygen-containing liquid remainder of at least one of said oxygen-rich liquids to a separate rectification at low pressure to produce a high-purity oxygen product of over 99% oxygen and an effluent gas of lower oxygen content; passing such effluent gas to join with the vapors in said main low-pressure rectification; effecting the boiling of high-purity liquid oxygen in said separate rectification to produce vapors for such rectification by heat exchange with an oxygen-containing portion of the said condensation pressure air for forming an oxygen-containing liquid fraction which condenses at said condensation pressure and at the higher temperature necessary for boiling the high-purity oxygen whereby high-purity oxygen and lower-purity oxygen may be produced with improved power consumption.

10. A process for the low-temperature separation of air according to claim 9, in which the last-named oxygen-containing liquid fraction is employed as reflux in said separate rectification.

11. A process for the low-temperature separation of air according to claim 9, in which the last-named oxygen-containing liquid fraction is fed to said main rectification.

12. Apparatus for the low-temperature separation of air including means by which atmospheric air is provided at a condensation pressure, cooled to a temperature of condensation of at least one of the constituents, substantially freed of moisture, carbon dioxide, and hydrocarbon impurities, and by which such air is subjected to a plurality of condensations to provide oxygen rich liquids, one of said condensations being effected in a preliminary separating chamber producing also a nitrogen-enriched fraction, in combination with a main rectifying column chamber; a second rectifying column chamber, both of said columns being adapted for operation at a low pressure and having oxygen boiling chambers at their lower ends; condenser means in heat exchange with the boiling chamber of the main column for condensing said nitrogen-rich fraction while under said condensation pressure; means for passing at least a substantial portion of such nitrogen-rich fraction to the upper end of the main column for use as reflux therein; means for withdrawing nitrogen product from the upper end of the main column; means for feeding an oxygen rich liquid to the upper part of said second column for use as reflux therein; means for passing the rest of the oxygen rich liquids to an intermediate part of the main column; means for passing the effluent from the top of said second column to said main column; means for heating the oxygen boiling chamber of said second column by heat exchange with an oxygen-containing vapor portion of air at condensation pressure; means for withdrawing product oxygen of less than 99% oxygen from said main column; and means for withdrawing product oxygen of higher purity from said second column.

13. Apparatus for the low-temperature separation of air according to claim 12 including means for delivering at least a liquefied portion of oxygen-containing material from said means for heating the oxygen boiling chamber of the second column to an intermediate part of said main column.

14. Apparatus for the low-temperature separation of air according to claim 12 including means for delivering at least a liquefied portion of oxygen-containing material from said means for heating the oxygen boiling chamber of the second column to an upper part of said second column.

15. Apparatus for the low-temperature separation of air according to claim 12 in which the condenser means in heat exchange with the boiling chamber of the main column is part of a higher pressure chamber having an inlet for condensation pressure air, and including means for delivering at least a portion of oxygen-containing vapor from said means for heating the oxygen boiling chamber of the second column to said higher pressure chamber.

16. Apparatus for the low-temperature separation of air according to claim 12, which includes an oxygen evaporator connected to receive liquid oxygen product from the boiling chamber of the main column; heating means for said evaporator adapted to condense a vapor at said condensation pressure; means for passing a small portion of the liquid oxygen from the boiling chamber of the second column to said evaporator; and means for eliminating impurities tending to accumulate in said evaporator.

17. Apparatus for the low-temperature separation of air which includes two sets of cold accumulators for cooling incoming air by regenerative heat exchange with outgoing products, one of the sets warming a nitrogen product while cooling a large portion of the air and the other set warming a lower purity oxygen product of less than 99% purity while cooling another portion of the air, and means for subjecting the cooled portions to a plurality of condensations to provide liquid fractions, in combination with a main rectifying column chamber; a second rectifying column chamber both of which are adapted for operation at a low pressure and having oxygen boiling chambers at their lower ends; means for passing at least a larger part of the liquid fractions to the main column for rectification to produce the nitrogen product and the lower purity oxygen product; means for passing an oxygen-rich liquid to said second rectifying column for rectification therein to produce a higher purity oxygen product and an effluent gas; means for passing such effluent from the top of the second column to said main column; means for heating the boiling chamber of said second column by heat exchange with an oxygen-containing vapor portion of air at condensation pressure; and means for withdrawing and warming the higher purity oxygen product from the boiling chamber of the second rectifying column by indirect or recuperative heat exchange.

18. Apparatus for the low-temperature separation of air according to claim 17, in which the means for warming the higher-purity oxygen product is a countercurrent heat exchanger adapted to cool another stream of incoming air.

19. Apparatus for the low-temperature separation of air according to claim 17, in which the means for warming the higher-purity oxygen product comprises passages in thermal relation with longitudinal shells of the nitrogen set of cold accumulators.

20. Apparatus for the low-temperature separation of air according to claim 17, in which the means for warming the higher-purity oxygen product comprises passages in thermal relation with longitudinal shells of the oxygen set of cold accumulators.

PHILIP K. RICE.
EDWARD F. YENDALL.

References Cited in the file of this patent

UNITED STATES PATENTS

| Number | Name | Date |
|--------|------|------|
| 1,510,178 | Lachmann | Sept. 30, 1924 |
| 2,040,116 | Wilkinson | May 12, 1936 |
| 2,101,300 | Weil | Dec. 7, 1937 |
| 2,209,748 | Schlitt | July 30, 1940 |
| 2,423,543 | Yendall | July 8, 1947 |
| 2,497,589 | Dennis | Feb. 14, 1950 |
| 2,513,306 | Garbo | July 4, 1950 |
| 2,514,391 | Haynes | July 11, 1950 |
| 2,514,921 | Yendall | July 11, 1950 |
| 2,547,177 | Simpson | Apr. 3, 1951 |